United States Patent [19]

Spencer et al.

[11] Patent Number: 5,086,707
[45] Date of Patent: Feb. 11, 1992

[54] SELF ADJUSTING CONSTANT CONTACT SIDE BEARING FOR RAILCARS

[75] Inventors: Charles P. Spencer, Staunton, Ill.; Terry L. Pitchford, Florissant, Mo.

[73] Assignee: AMSTED Industries Incorporated, Chicago, Ill.

[21] Appl. No.: 685,044

[22] Filed: Apr. 15, 1991

[51] Int. Cl.⁵ .............................................. F16F 1/36
[52] U.S. Cl. ................................ 105/199.3; 384/423
[58] Field of Search ............... 105/199.3, 199.1, 199.2, 105/199.4; 324/423; 267/3, 4

[56] References Cited

U.S. PATENT DOCUMENTS

| | | | |
|---|---|---|---|
| 3,218,989 | 11/1965 | Kreiner et al. | 267/3 |
| 3,707,927 | 1/1973 | Geyer et al. | 105/199.3 |
| 3,712,691 | 1/1973 | Cope | 105/199.3 |
| 3,730,104 | 5/1973 | Hood, II | 267/3 |
| 3,748,001 | 7/1973 | Neuman et al. | 105/199.3 |
| 3,897,737 | 8/1975 | Davis | 105/199.3 |
| 3,915,520 | 10/1975 | Hassenauer | 267/3 |
| 4,130,066 | 12/1978 | Mulcahy | 105/199.3 |
| 4,381,589 | 5/1983 | Cope | 29/149.5 R |
| 4,712,487 | 12/1987 | Carlson | 105/199.3 |
| 4,793,720 | 12/1988 | Merker | 384/423 |
| 4,998,997 | 3/1991 | Carlston | 267/3 |
| 5,036,774 | 8/1991 | Curtis et al. | 105/199.3 |

FOREIGN PATENT DOCUMENTS 2191162 12/1987 United Kingdom ............. 105/199.3

OTHER PUBLICATIONS

A. Stucki Company, "Stucki Hi-Performance Metal Capped Resilient Side Bearings", 2 pages.

Primary Examiner—Robert J. Oberleitner
Assistant Examiner—Mark T. Le
Attorney, Agent, or Firm—Edward J. Brosius; F. S. Gregorczyk

[57] ABSTRACT

A constant contact side bearing or railcar trucks utilizes wedges or rollers to adjustably separate opposing and converging surfaces of a base member and a vertically biased cap member.

20 Claims, 2 Drawing Sheets

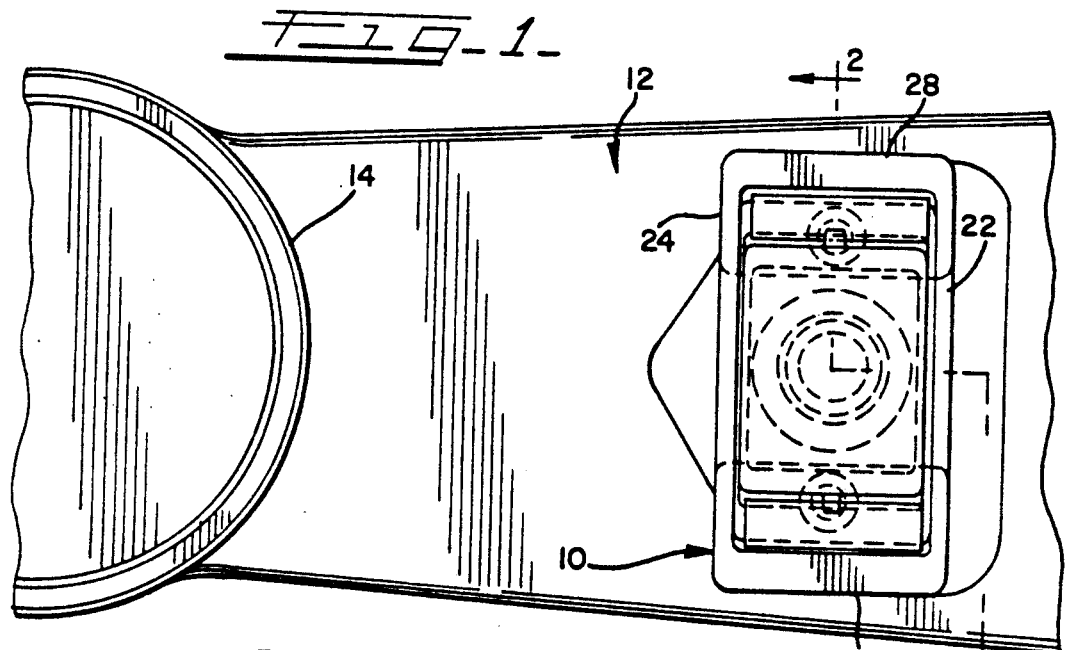
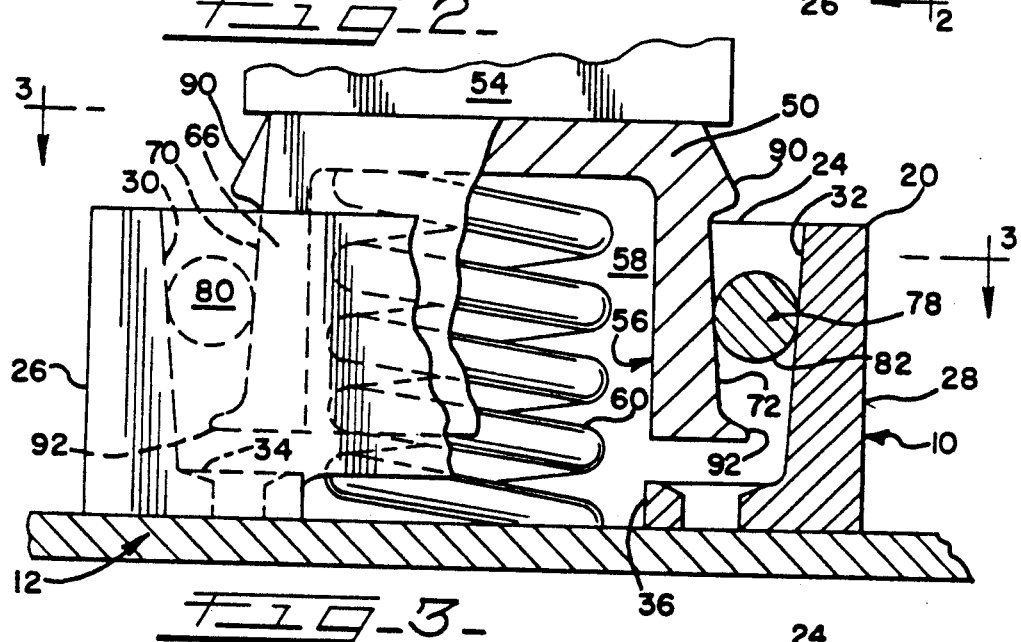
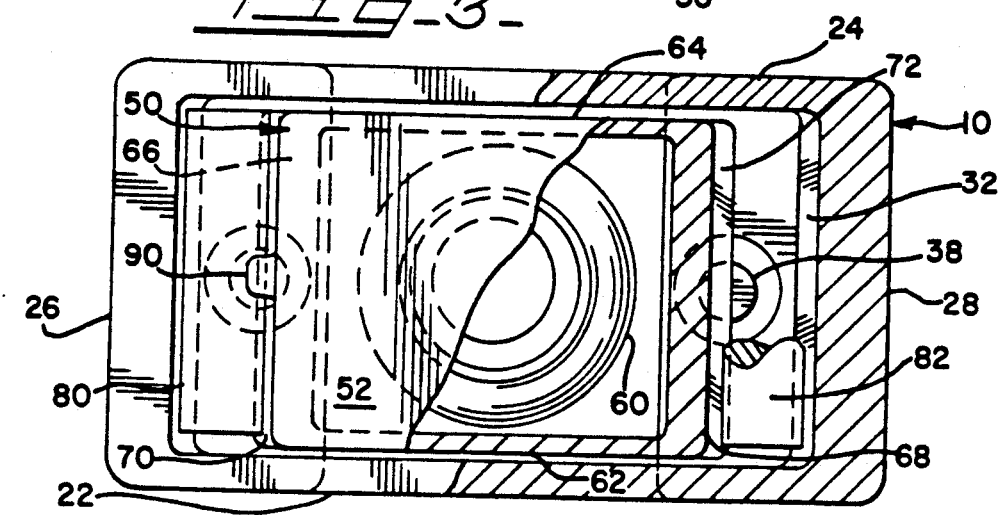

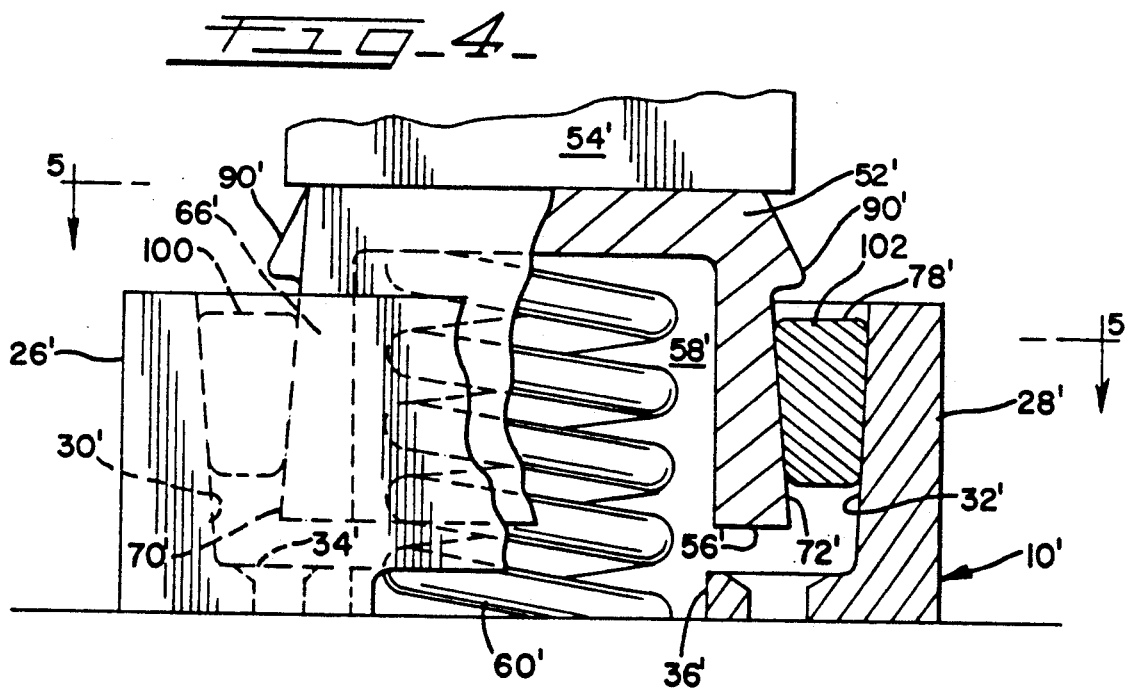
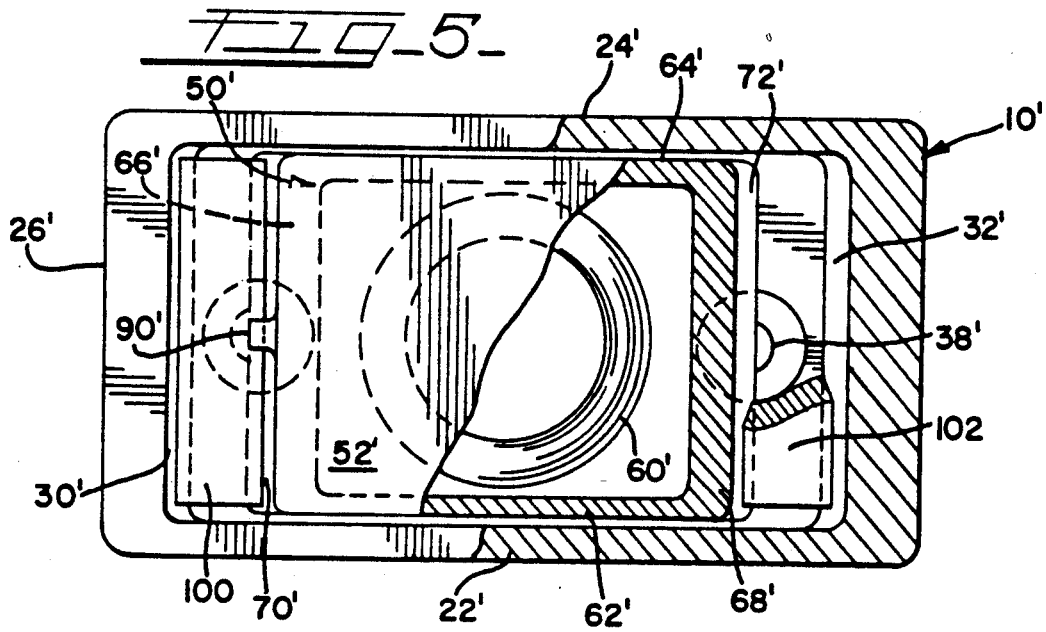

SELF ADJUSTING CONSTANT CONTACT SIDE BEARING FOR RAILCARS

BACKGROUND OF THE INVENTION

This invention relates to railcar trucks and more particularly to an improved constant contact type side bearing mountable on a truck bolster to contact the underside of a railcar body.

The usual freight railcar comprises a car body supported on at least one, and usually two, wheeled trucks that are confined to roll on rails. Each truck includes a truck bolster that extends essentially transversely of the car body longitudinal center line and pivotally supports the car body. In the preponderance of freight cars in domestic use, the pivotal connection is made by center bearing plates and bowls transversely centered on the car body underframe and the truck bolster. Accordingly, the truck may turn or pivot on the center plate under the car body and, under certain dynamic conditions and car speeds during operation, the truck may tend to adversely oscillate or "hunt" in a yaw-like manner beneath the car body. Also, the car body is subject to adversely roll from side to side during operation. Side bearings positioned on the truck bolster outwardly of the center bowl are commonly employed to control both such adverse conditions by frictionally retarding oscillations and cushioning and limiting the extent of the rolling motions. Constant contact type side bearings usually include a base that is fastened to the bolster and a cap that is biased upward from the base so as to contact bearing pads on the car body underframe. The cap must be free to move vertically with respect to the base, and during the course of operation, the clearance between those parts will be enlarged due to abrasion and wear. Pivotal movement of the truck beneath a car body will apply large frictional forces to the cap in a generally longitudinal direction of the car body tending to wear the longitudinal ends of the cap and base. As longitudinal wear occurs the cap becomes free to move longitudinally and thus, the ability to dampen oscillations (hunting) of the truck is reduced. Also, the longitudinal forces tend to cant or tilt the cap with respect to the base and that tendency increases as the clearance between cap and base becomes enlarged through wear. When the cap becomes canted, the ability to dampen oscillations (hunting) and cushion roll will be further hindered.

SUMMARY OF THE INVENTION

Accordingly, it is a principal object of the present invention to provide a railcar side bearing that automatically adjusts and compensates for wear between cap and base parts.

Another object of the present invention is to provide a railcar truck constant contact side bearing having a self adjusting spacing member between the cap and base parts.

Briefly stated, the invention includes a base member and a cap member that is vertically movable respecting the base member and at least one self adjustable spacing member positioned between longitudinally adjacent portions of those two members.

BRIEF DESCRIPTION OF THE DRAWINGS

Other objects and advantages of the invention will become apparent upon reading the following detailed description in conjunction with the drawings wherein:

FIG. 1 is a partial plan view of a railcar truck bolster with one embodiment of a side bearing of the present invention located thereon;

FIG. 2 is an enlarged partially sectioned end view of the side bearing shown in FIG. 1;

FIG. 3 is a plan view in partial section of the side bearing taken at line 3—3 of FIG. 2;

FIG. 4 is a partially sectioned end view of a second embodiment of a side bearing of the present invention; and FIG. 5 is a plan view in partial section of the side bearing taken at line 5—5 of FIG. 4.

DETAILED DESCRIPTION OF THE INVENTION

In FIG. 1 a side bearing generally 10 is shown mounted on a truck bolster generally 12 outwardly of a truck center bowl 14. As better seen in FIGS. 2 and 3, the side bearing generally 10 includes a boxlike base member 20 having upstanding side walls 22, 24 and end walls 26, 28. The end walls 26, 28, as shown in FIG. 2, each have sloped inner surfaces 30, 32, respectively; and at the bottom of the end walls there are inwardly turned feet 34, 36 containing counter sunk holes 38 for the insertion of bolts or the like (not shown) to secure the side bearing 10 to the bolster 12.

A cap member generally 50 is positioned to move vertically on the base member 20. In the preferred embodiments, the cap 50 is within the walls of the base member 20 and comprises a top bearing surface 52 that frictionally engages a bearing pad generally 54 that is mounted on the underside of a car body part such as a body bolster (not shown). A skirt generally 56 depends from the bearing surface 52 and forms a spring cavity 58 to receive a biasing member such as a coil spring 60 that is seated within the base member 20 on the bolster 12 and urges the cap 50 upwardly so as to constantly engage the car body pad 54. Other biasing members such as elastomer bodies may also be substituted for the coil spring 60.

As best seen in FIGS. 2 and 3, the skirt 56 of cap generally 50 in the preferred embodiments fits within the base member side and end walls 22, 24, 26 and 28 and includes vertical side portions 62, 64, that are closely adjacent and parallel the base member side walls 22, 24; and end portions 66, 68 that are spaced from the base member end walls 26 28. The cap member end portions 66, 68 include sloped outer surfaces 70, 72 that are inclined oppositely to the opposing surfaces 30, 32 of the base member end walls 26, 28.

It will be seen that each pair of spaced and opposing sloped surfaces 30–70 and 32–72 converge inwardly in a downward direction and are separated and held apart by a spacing member generally 78 such as cylindrical rollers 80, 82 shown in FIGS. 2 and 3. In this embodiment of FIGS. 2 and 3, there are upper and lower detents 90, 92 on each of the sloped outer surfaces 70, 72 of the cap member generally 50 which serve to maintain the spacing members generally 78 within the separations between cap 50 and base 20.

A second embodiment of the invention is illustrated in FIGS. 4 and 5 wherein elements corresponding to those heretofore described are identified with the same reference characters bearing a prime notation. In the second embodiment, the spacing members generally 78 are in the form of wedge shims, 100, 102. Also in this embodiment, there is no lower detent (as shown at 92 in FIG. 2) on the sloped outer surfaces 70', 72' of cap member generally 52'.

In both embodiments the angles of inclination for the sloped inner surfaces 30, 32 and sloped outer surfaces 70, 72 are limited only to the extent that they may not be so large as to cause a spacing member generally 78 to be propelled upwardly when subjected to a longitudinal force as occurs when a truck pivots and the frictional resistance between the cap bearing surface 52 and car body pad causes a longitudinal (respecting railcar centerline) force to be applied against the cap. Each angle of inclination may range between about 1°-15° from the vertical and preferably ranges between about 1°-10°. Thus, the angle at which an adjacent opposing pair of inner and outer sloped surfaces 30-70, or 32-72, converge will range between about 2°-30° and preferably between 2°-20°.

It will be understood from the foregoing structural description that each embodiment of spacing member 78, that is either rollers 80, 82 or wedges 100, 102, will self adjust to any increase in separation between the cap member generally 50 and base member generally 20 by moving downwardly between the converging sloped surfaces. Furthermore, both embodiments of spacing member 78 will freely move upward and downward with corresponding movement of the cap member generally 50 while continuously maintaining contact with both of the engaging sloped surfaces. That is the rollers 80, 82 will roll respecting the sloped surfaces as the cap 50 moves up and down; and similarly, wedges 100, 102 will slide on the sloped surfaces as cap 50 moves up and down.

It is preferred that all of the aforedescribed side bearing parts be manufactured of hardened steel; however, it is also possible to form the spacing members generally 78 (either cylindrical rollers 80, 82 or wedges 100, 102) from a hard polymer material.

It will also be understood that the foregoing embodiments may be modified to employ a single spacing member generally 78 and include sloped inner and outer surfaces only at one end of the base and cap members.

The foregoing details have been provided to describe a best mode and preferred embodiments of the invention and further variations and modifications may be made without departing from the spirit and scope of the invention which is defined in the following claims.

What is claimed is:

1. An improved railcar truck side bearing, said bearing comprising:
    a base member having a bottom for attachment to the upper surface of a truck bolster, said base member also having at least one upstanding end wall;
    a cap member mounted for vertical movement with respect to said base, said cap member having at least one depending end portion spaced from said upstanding end wall of said base member;
    opposing surfaces on each of said end portion and end wall and at least one of said opposing surfaces being inclined with respect to the other of said opposing surfaces so as to converge toward said bottom of said base member;
    spacing means for maintaining said opposing surfaces separated, said means being positioned between said end wall and said end portion and being moveable with respect to said opposing surfaces as said cap member moves with respect to said base;
    and a biasing member under said cap member to urge said cap member upwardly of said base member.

2. The side bearing of claim 1 wherein said spacing means is a cylindrical roller.

3. The side bearing of claim 1 wherein said spacing means is a wedge shim.

4. The side bearing of claim 1 wherein both of said opposing surfaces are inclined and converge toward one another.

5. The side bearing of claim 4 wherein said spacing means is a cylindrical roller.

6. The side bearing of claim 4 wherein said spacing means is a wedge shim.

7. The side bearing of claim 1 wherein said cap member is mounted within said base member and an end portion of said cap has an outer opposing surface that is spaced from an inner opposing surface on said end wall of said base.

8. The side bearing of claim 7 including an upper detent on said outer opposing surface whereby to limit upward movement of said spacing means.

9. The side bearing of claim 7 wherein said spacing means is a cylindrical roller.

10. The side bearing of claim 9 wherein said outer opposing surface upper and lower detents whereby to limit vertical movement of said cylindrical roller.

11. The side bearing of claim 7 wherein said spacing means is a wedge shim.

12. The side bearing of claim 8 wherein said spacing means is a wedge shim.

13. An improved railcar truck side bearing, said side bearing comprising:
    a base member of boxlike shape having two upstanding side walls, two upstanding end walls and a bottom part for attachment to a truck bolster;
    a cap member mounted within said side walls and end walls of said base member, said cap member having a depending skirt with two end portions in spaced opposition to said end walls of said base member;
    sloped outer surfaces on each of said end portions of said cap members;
    sloped inner surfaces on each of said end walls of said base member, said sloped inner and outer surfaces being inclined to converge inwardly toward said bottom part of said base member;
    spacing means for maintaining each of said sloped outer surfaces separated from an opposing said sloped inner surface, said spacing means being positioned between each said end portion of said cap member and said end wall of said base member;
    and a biasing member under said cap member to urge said cap member upwardly of said base member.

14. The side bearing of claim 13 wherein said biasing member is a coil spring that fits within said skirt of said cap member.

15. The side bearing of claim 13 wherein said spacing means are cylindrical rollers.

16. The side bearing of claim 13 wherein said spacing means are wedge shims.

17. The side bearing of claim 13 including an upper detent on each of said outer opposing surface whereby to limit upward movement of said spacing means.

18. The side bearing of claim 17 wherein said spacing means are cylindrical rollers.

19. The side bearing of claim 17 wherein said spacing means are wedge shims.

20. The side bearing of claim 13 wherein said spacing means are cylindrical rollers and wherein each of said sloped outer surfaces has upper and lower detents whereby to limit vertical movement of said cylindrical roller.

* * * * *